Jan. 13, 1942.   H. FORD   2,269,451
AUTOMOBILE BODY CONSTRUCTION
Filed May 15, 1940   3 Sheets-Sheet 1

Henry Ford
INVENTOR
BY Edwin C. McRae
E. L. Davis
ATTORNEYS.

Jan. 13, 1942.   H. FORD   2,269,451
AUTOMOBILE BODY CONSTRUCTION
Filed May 15, 1940   3 Sheets-Sheet 2

Henry Ford
INVENTOR
BY Edwin C. McRae
E. L. Davis
ATTORNEYS.

Jan. 13, 1942.  H. FORD  2,269,451
AUTOMOBILE BODY CONSTRUCTION
Filed May 15, 1940  3 Sheets-Sheet 3

Henry Ford
INVENTOR
BY Edwin C. McRae
E. L. Davis
ATTORNEYS.

Patented Jan. 13, 1942

2,269,451

UNITED STATES PATENT OFFICE 2,269,451

AUTOMOBILE BODY CONSTRUCTION

Henry Ford, Dearborn, Mich., assignor to Ford Motor Company, Dearborn, Mich., a corporation of Delaware Application May 15, 1940, Serial No. 335,234

4 Claims. (Cl. 296—28)

The object of my invention is to provide an automobile body construction of improved construction.

More specifically, the object of my invention is to provide a body construction in which plastic body panels are employed, not only for the doors and side panels, but also for the roof, hood and all other exposed panels on the body.

Plastic parts have many advantages in that they produce a quiet body, may be molded to exact sizes, may be formed economically from soy bean oil, may be readily replaced in case of accident, and result in a lighter construction. However, there are also many disadvantages to all such constructions in the past because the panels are not able structurally to resist the stresses to which such panels are exposed in the conventional body. In the present all-steel body the panels are depended upon almost entirely to resist the many stresses set up in the body.

An object of this invention is, therefore, to provide a body frame structure which will resist all normally encountered stresses independently of the body panels.

At the present time the general practice in the manufacture of automobiles is to provide a relatively stiff chassis frame upon which is mounted a built-up body structure, the body usually being formed of sheet metal stampings welded in place over a relatively light sheet metal frame. Such bodies are proportioned to stand up against ordinary loads but depend upon the chassis frame to resist the twisting stresses set up in the operation of the car over rough roads. Many attempts have been made to produce a unitary body and frame structure and, while some progress has been made along this line, still none of these structures, to the applicant's knowledge, are capable of resisting the twisting strains resisted by the structure described herein.

The structural members of my improved body construction are all of tubular cross section and are welded together to form a unitary frame structure. One important difference between my improved construction and the older body and frame designs is that I provide transverse cross members at the front and rear of the body and extend continuous tubular members from the ends of the front cross member upwardly to the car roof diagonally across the center of the car roof and downwardly to the opposite end of the rear cross member, the two diagonally extending tubes being welded together at their point of cross-over. The door pillars and other braces extend between these two diagonally extending tubular members and the body sill members, respectively, to support the diagonal members against bending under compression at several points therealong.

With these and other objects in view, my invention consists in the arrangement, construction and combination of the various parts of my improved construction, as described in this specification, claimed in my claims, and illustrated in the accompanying drawings, in which:

Figure 1:
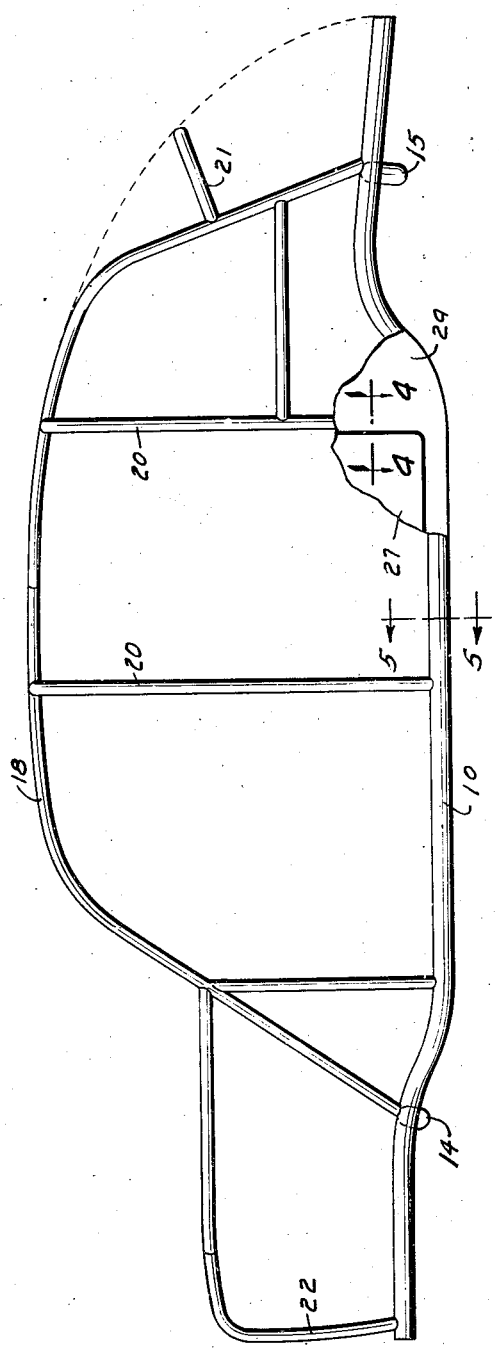
Figure 1 is a side elevation of my body and frame structure, the panels being broken away to better illustrate the frame.
Figure 5:
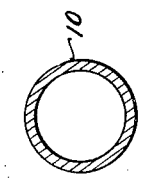
Figure 5 is a sectional view, taken on the line 5—5 of Figure 1.

Referring to the accompanying drawings, I have used the reference numeral 10 to indicate tubular side members which extend the full length of the vehicle, the respective ends of these tubes being joined together by front and rear tubular cross members 11 and 12, respectively. A pair of center tubular cross members 13 extend transversely across the intermediate portions of the side members 10 and have their ends welded to these side members.

Tubular spring supporting members 14 and 15 extend transversely between the side members 10, the member 14 being longitudinally spaced between the cross members 11 and 13 and the member 15 positioned between the cross members 13 and 12. A front transverse spring, shown by dotted lines 16, is bolted to the center portion of the cross member 14 and a rear transverse spring, shown in dotted lines 17, is bolted to the rear supporting member 15. The body construction is supported entirely upon these transverse springs so that the entire weight of the body must be carried by the cross members 14 and 15.

I have provided two tubular members 18 which extend upwardly from the intersection of the side members 10 and the ends of spring cross member 14 to the front upper corners of the vehicle roof and diagonally across the roof to the opposite rear corners and then downwardly to the members 10 at the point of intersection with the rear spring member 15. The tubular members 18 are welded to the side members 10 and are welded together at the point of cross-over at the center of the car roof. These members form the main structural members of the frame.

A pair of lateral tubular braces 19 extends between the forward vertical portions of the members 18 and forms an outline for the vehicle windshield, while L-shaped tubular pillar members 20 extend from the diagonal portions of the members 18 outwardly to the sides of the vehicle roof and downwardly to the side members 10. These members 20 serve as door pillars. A bowed tubular member 21 extends laterally between the rear vertical portions of the members 18 and forms the support for the rear portion of the body.

Figure 2:
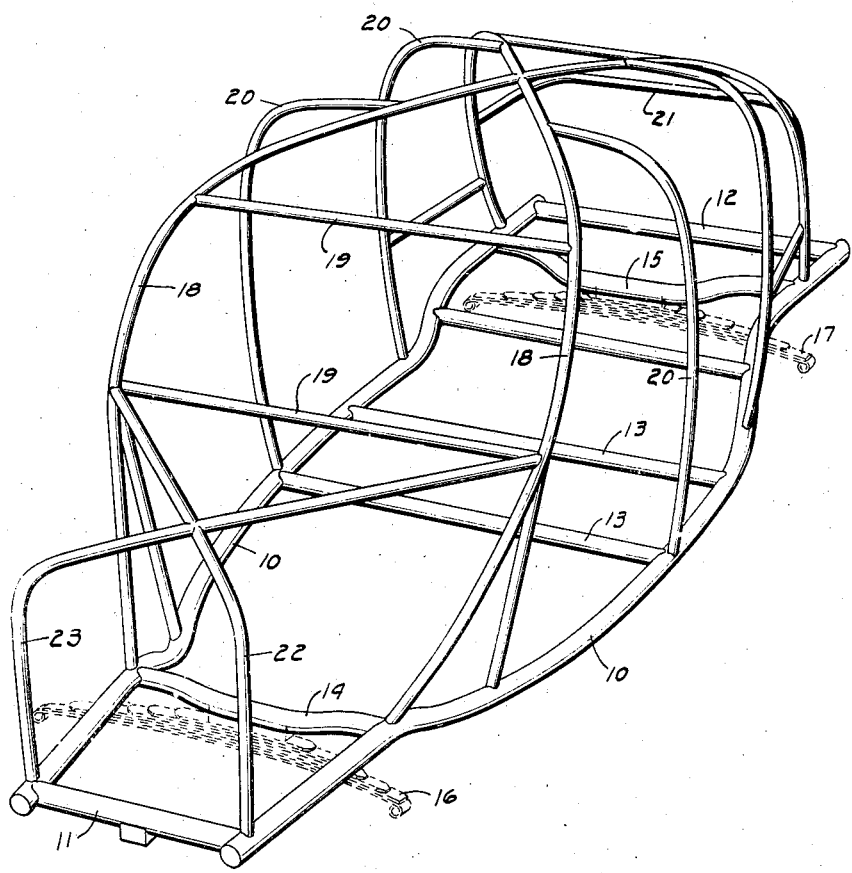
Figure 2 is a perspective view of my frame and body supporting structure showing a quarter front view.
Figure 3:
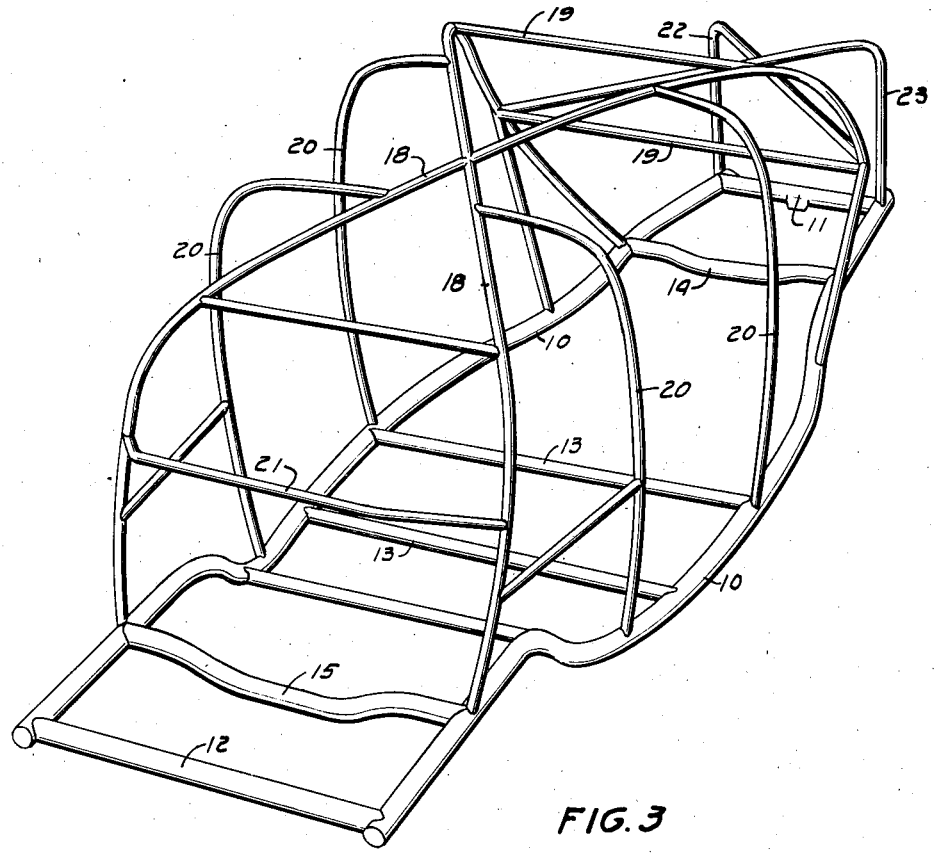
Figure 3 is a perspective rear quarter view of the construction shown in Figure 2 and, Figure 4 is a sectional view, taken on the line 4—4 of Figure 1.

It will be noted from Figure 2 that tubular diagonal bracing is applied to the front end of the body structure member, this bracing consisting of a member 22 which extends upwardly from the intersection of the front cross member 11 and one of the side members 10 and then diagonally and rearwardly to the opposite side of the car where it intersects the tubular member 18 at its intersection with the cross brace 19. A second tubular member 23 extends from the other end of the front cross member 11 upwardly and diagonally across to the opposite side of the car. The members 22 and 23 are welded together at the point where they cross over so that the front end of the body is thereby resisted against diagonal loads. The body structure as a whole is resisted by the members 18 against diagonal stresses.

This diagonal bracing is highly important in connection with automobile bodies as the major forces induced upon such bodies are in a diagonal direction. The chief disadvantage of former unitary body and frame constructions has been that a relatively minor impact blow upon one front corner of the car caused the body to warp diagonally and has in many cases caused a wrinkle in one of the rear quarter panels of the body. With my improved structure diagonal warping of the body is better resisted to thereby prevent such an occurrence.

Figure 4:
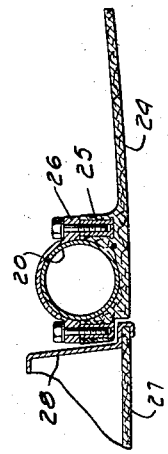

Figure 4 illustrates one means for securing the body panel to the above described frame. From this view it will be noted that a plastic panel 24 is provided with semicircular lugs 25 molded thereon which fit around half of each tubular member. Caps 26 clamp around the other half of the tube to secure the panel in place.

The door panel 27 is secured to a door frame 28 around its outer edges. Other means may be provided for securing such panels to my improved body frame.

Among the many advantages arising from the use of my improved body structure it may be well to mention that in this design the structural members are designed to resist the bending and weaving stresses independently of the body panels so that relatively light molded panels may be inserted between the structural members without materially weakening the body structure as a whole. This was impossible with the older body type of structure, as the body panels functioned to resist the major portion of the structural loads taken by the body. The advantages of isolating the body panels from the structural load carrying members are that a relatively weak panel member may be used, and in case the panel member is damaged, it may readily be replaced with a minimum of labor and cost. With the present body construction the panel members are welded together so that in case one is damaged, a relatively expensive welding or bumping operation is required.

Some changes may be made in the arrangement, construction and combination of the various elements comprising my improved body structure without departing from the spirit of my invention, and it is my intention to cover upon my claims such changes as may reasonably be included within the scope thereof.

I claim as my invention:

1. A vehicle body comprising, a pair of tubular side members extending the length of said body along its lower outer edges, tubular cross members extending between said side members at each end thereof, a pair of tubular spring supporting members extending between said side members and spaced inwardly from said end cross members, a plurality of intermediate tubular cross members extending between said side members intermediate of said spring supporting members, the ends of said cross members and said spring supporting members being fixedly secured to said side members, a pair of main tubular structural members each of which extends continuously from one of said side members at its point of intersection with said front spring supporting member upwardly and rearwardly to the top of said body and diagonally across the roof of said body downwardly to the other of said side members at its point of intersection with said rear spring supporting member, said main diagonal members intersecting each other in the roof of said vehicle and being fixedly secured to each other at said point of intersection, a pair of secondary tubular structural members each of which extends continuously from one of said side members at its point of intersection with said front end cross member upwardly and then diagonally rearwardly to intersect said main structural members, said secondary structural members intersecting each other and being fixedly secured together at the point of intersection, and a substantially vertical strut extending from the points of intersection of said main structural members with said secondary structural members to the corresponding side members.

2. The structure of claim 1, which is further characterized in that door pillar members extend upwardly from intermediate points along said side members to the roof of said vehicle and inwardly to said diagonal members to which they are fixedly secured.

3. The structure of claim 1, which is further characterized in that door pillar members extend upwardly from intermediate points along said side members to the roof of said vehicle and then inwardly to said main diagonal members to which they are fixedly secured, the upper outer edges of said body being defined by portions of said main diagonal members and said door pillars.

4. The structure of claim 1, which is further characterized in that a plurality of plastic body panels are independently secured to said above-described members, said panels being provided with semicircular lugs adjacent to their edges, said lugs being designed to engage said tubular members, and caps cooperating with said lugs by means of which said panels may be maintained in an assembled position.

HENRY FORD.